(No Model.)

A. DOLGE.
PIANO FORTE HAMMER.

No. 364,496. Patented June 7, 1887.

WITNESSES:
William Miller
Edward Wolff

INVENTOR
Alfred Dolge.
BY Van Santvoord & Hauff,
ATTORNEYS

United States Patent Office.

ALFRED DOLGE, OF NEW YORK, N. Y.

PIANO-FORTE HAMMER.

SPECIFICATION forming part of Letters Patent No. 364,496, dated June 7, 1887.

Application filed March 3, 1887. Serial No. 229,565. (No model.)

*To all whom it may concern:*

Be it known that I, ALFRED DOLGE, a citizen of the United States, residing at New York, in the county and State of New York, have invented new and useful Improvements in Piano-Forte Hammers, of which the following is a specification.

This invention has for its object to provide novel, efficient, and durable piano-forte hammers which possess and retain resiliency and preserve their proper shape. This object I accomplish in the manner and by the means hereinafter described and claimed, reference being had to the accompanying drawings, in which—

Figure 1:
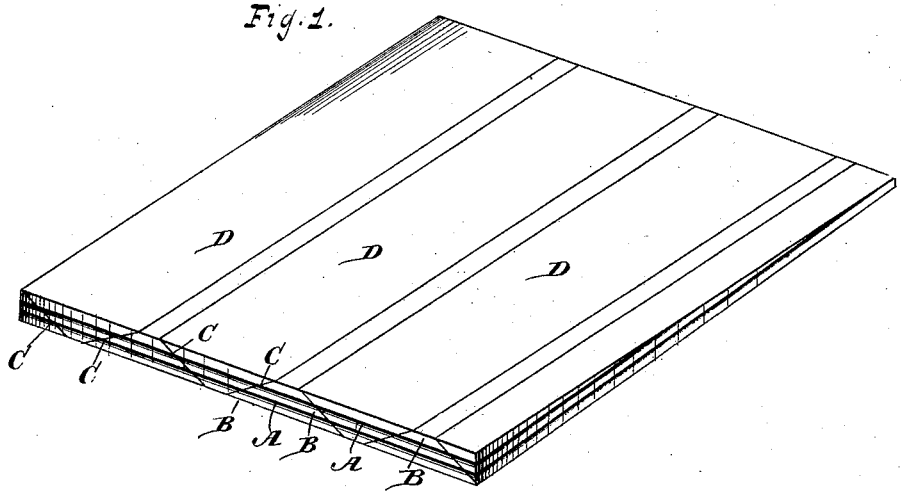
Figure 2:
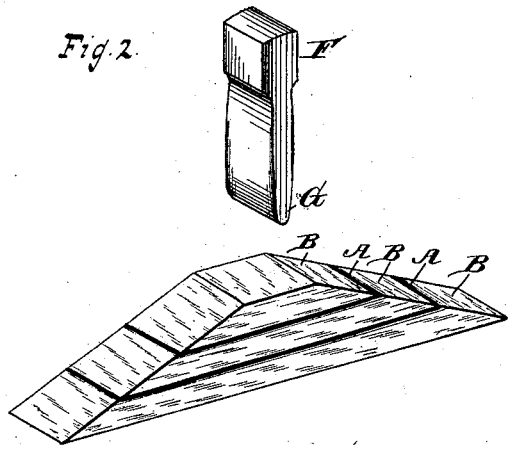
Figure 3:
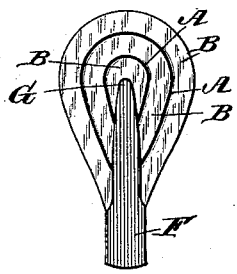

Figure 1 is a view in perspective of the material from which the body of the hammer is made. Fig. 2 is a perspective view of a piece of said material sufficient for a hammer-body. The hammer-mold is shown detached. Fig. 3 is a side elevation of a completed hammer made from said material.

Similar letters indicate corresponding parts.

It has been common to form the bodies of piano-forte hammers out of a single thickness of felt; but the repeated blows of the hammers against the strings tend to alter the shape of the hammer-body by expanding its sides under the influence of the blows against the strings, and also tend to lessen the natural resiliency of the felt.

My invention has for its object to overcome these defects and to construct hammer-bodies which will in a larger degree possess and retain the quality of resiliency, and will also retain their proper shape.

In carrying out this invention I employ layers of textile or woven fabric alternating with layers of felt, and thus make a composite fabric from which I cut blanks of the proper size and shape for forming hammer-bodies. The textile fabric is made or woven of coarse meshes—that is to say, the fabric is not closely woven, the meshes being open, so as to allow the projecting fibers of the felt to engage with the meshes and pass through them more or less. The threads of which the textile fabric is made are preferably hard-finished, so as to cause the fabric to have considerable stiffness and elasticity and enable it to act as a support for the felt.

Having prepared a piece, B, of felt of suitable size, the same is laid down upon a suitable table, and upon it is placed a layer, A, of woven or textile fabric of the same length and breadth, and upon the fabric A is placed another sheet or layer, B, of felt, and upon that another sheet or layer of fabric, A, and upon that another sheet or layer of felt, B, and so on in alternation until the combined sheet is as thick as required for the body of the hammer. The upper and lower layers of the combined sheet will be of felt.

I do not confine myself to any particular number of layers A B. For example, the combined sheet may be formed of a bottom layer of felt, B, a layer of textile or woven fabric, A, placed upon that, and a top layer of felt, B, placed upon the layer A; or there may be an additional layer or layers, both of the fabric A and felt B, depending upon the thickness of the felt or other material employed, or the thickness to be given to the hammer-body.

The several layers A B may be cemented to each other by suitable adhesive material, if desired; but I prefer to unite them to each other by rubbing them upon each other, so as to unite them to each other by a felting action, which will take place under suitable manipulation, as the fibers of the felt will interlock with the meshes of the textile fabric, and passing through said meshes will engage with the fibers of the felt on each side of the textile fabric.

Having made the combined sheet in the manner described, or in any other suitable manner, the same is divided longitudinally along divergent lines C by cutters into elongated strips or blanks D, from which the hammer-bodies are formed and applied to the hammer-molds in the usual or any convenient manner.

Fig. 3 represents a completed hammer made from the composite material above described, the several layers A B being properly secured by cement or in any suitable manner to the sides of the hammer-mold F, the inner layer B, which is next to the top G of the hammer-mold, and the outer layer B, being of felt, as above described, the arrangement of the different layers of felt and textile material A B, and the order of their location with reference to each other being as herein described and as shown in the elevation of the completed hammer, Fig. 3, and as shown in Fig. 2, where the layers of the hammer-body are shown as they would appear before they are bent around and applied to the hammer-mold.

I am aware that it has been proposed to employ cloth, felt, rubber, and leather in the construction of piano-forte hammers; but I am not aware that prior to my invention a piano-forte-hammer body has been composed of a series of pieces of felt and textile fabric alternating with each other, as hereinbefore set forth.

Having thus described my invention, what I claim is—

1. In piano forte hammers, the combination of the hammer-mold F with a hammer-body composed of alternating layers of felt and textile or woven fabric, arranged substantially as shown and described.

2. A hammer-body for piano-forte hammers, composed of alternating layers of felt and textile or woven fabric combined together, substantially as shown and described.

3. The method herein described of making material for piano-forte-hammer bodies, which consists in uniting together alternating layers of felt and textile or woven fabric by a felting action which interlocks the fibers of the felt with the meshes of the textile or woven fabric, and then severing such sheet of material on inclined divergent lines into elongated strips, substantially as and for the purposes set forth.

In testimony whereof I have hereunto set my hand and seal in the presence of two subscribing witnesses.

ALFRED DOLGE. [L. S.]

Witnesses:
W. HAUFF,
E. F. KASTENHUBER.